(No Model.)
H. R. RANDALL.
APPARATUS FOR EXPRESSING MALT EXTRACTS FROM THE HUSKS OF BREWERS' MASH.
No. 265,702.        Patented Oct. 10, 1882.
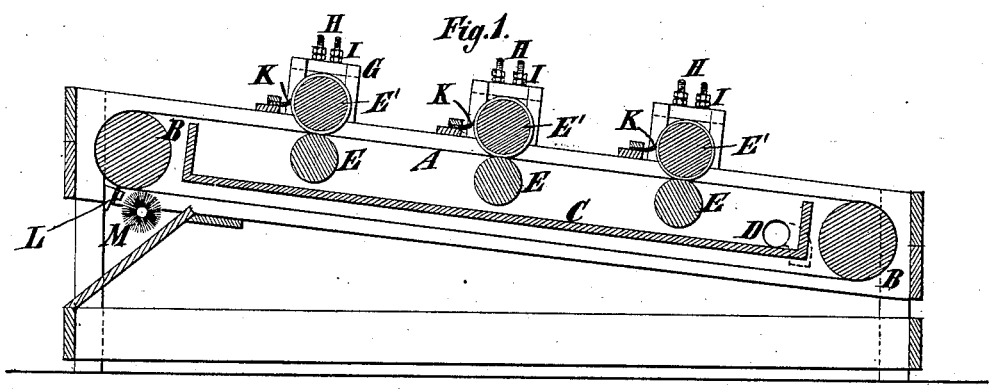
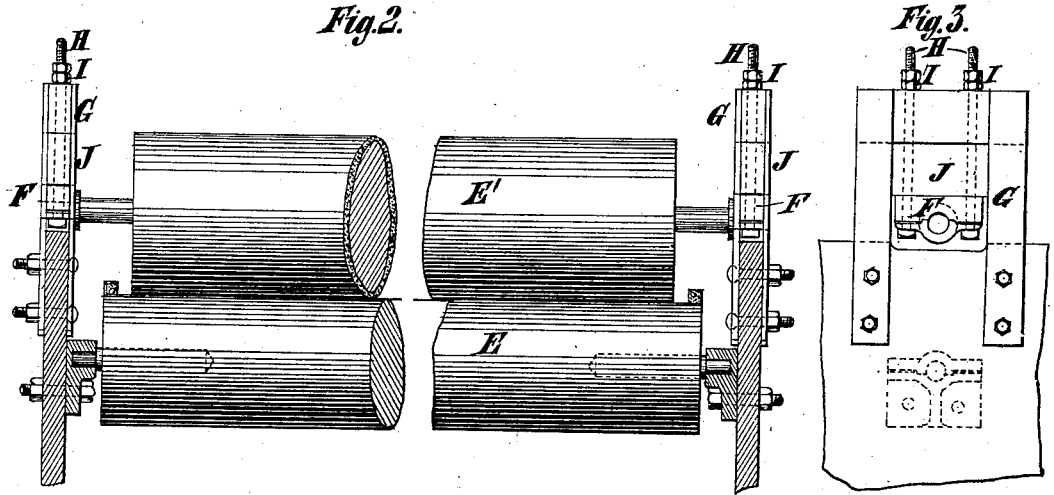
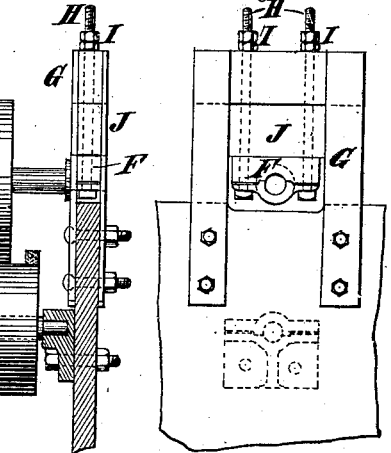
Witnesses
T. J. Keane
James R. Bowen
Inventor
Henry R. Randall
By his Atty
Edwin H. Brown

UNITED STATES PATENT OFFICE.

HENRY R. RANDALL, OF BROOKLYN, NEW YORK, ASSIGNOR OF ONE-HALF TO CHARLES G. TILL, OF SAME PLACE.

APPARATUS FOR EXPRESSING MALT EXTRACTS FROM THE HUSKS OF BREWERS' MASH.

SPECIFICATION forming part of Letters Patent No. 265,702, dated October 10, 1882.

Application filed January 28, 1882. (No model.)

*To all whom it may concern:*

Be it known that I, HENRY R. RANDALL, of Brooklyn, in Kings county, and the State of New York, have invented certain new and useful Improvements in Apparatus for Expressing Malt Extracts from the Husks or Refuse of Brewers' Mash, of which the following is a specification.

My improvements relate to the particular kind of apparatus which comprises a reticulated or foraminous apron, on which the brewers' mash is deposited, and by which it is carried to rollers that subject it to pressure sufficient to express the malt extract.

One object of my improvements is to prevent solid portions of the mash from falling laterally over the edges of the apron into the receptacle which is designed to receive the malt extract when expressed.

To this end my improvements consist in the combination, in an apparatus for expressing malt extract or analogous matter, of a reticulated or foraminous apron provided at the edges with upwardly-projecting ribs or ledges, a receptacle for liquid, arranged below and extending beyond the edges of said apron, and rollers above the apron for exerting a pressure on the same, and made shorter than the width of the apron, so as to work between and not press upon the ribs or ledges, as more fully hereinafter described.

Another object of my present improvements is to afford provision for the yielding upwardly of the rollers which exert a pressure on the mash, in order that they may rise when any rigid substance passes under them, and thereby avoid sustaining injury or entailing injury on the apron.

To this end my improvements consist in the combination, with a reticulated or foraminous apron and rollers which exert a pressure on the substance carried by it, of yielding bearings hung by bolts, whereby they may be adjusted up or down, and on which they may rise and fall automatically. Blocks of india-rubber or other springs will be interposed between the upper surface of the bearings and their housings.

In the accompanying drawings, Figure 1 is a central longitudinal section of an apparatus embodying my improvements. Fig. 2 is a sectional view of the side pieces of the frame, a face view of a pair of rollers, and a transverse section of the apron of such apparatus, all on a larger scale; and Fig. 3 is a side view of a portion of one of the side pieces of the frame and a housing and bearing for one of the rollers.

Similar letters of reference designate corresponding parts in all the figures.

A designates an endless apron of reticulated or foraminous material, such as wire-gauze. It is supported by rollers B, one of which is rotated to impart motion to it. These rollers are supported in an inclined frame, and the apron travels in inclined planes between the rollers. Below the upper portion of the apron is a receptacle, C, extending beyond the edges of the apron, for malt extract, which is expressed from mash on the apron. At the lower end this receptacle is provided with an outlet, D. The upper portion of the apron passes between pairs of rollers E E', by which the malt extract is expressed from the mash carried between them on the apron. The lower rollers, E, support the apron, while the upper rollers, E', exert a pressure on the mash carried by it. These rollers E E' may be made of wood, metal, or other suitable material, and may all be faced with india-rubber, although I have only shown the rollers E' as provided with facings of india-rubber. The upper rollers, E', are supported in bearings F, which can move vertically in housings G, attached to the side pieces of the frame of the apparatus. These bearings are hung on bolts H, which are provided with nuts I, whereby the bearings may be raised or lowered to cause the rollers E' to press with greater or less force on the mash carried by the apron. Between the upper surface of the said bearings and the tops of the housings are arranged blocks of india-rubber, J, or other springs, which force the bearings downward, and thereby cause the rollers E' to exert a pressure on the mash carried by the apron.

Scrapers K may be used in conjunction with the rollers E' to keep them clean, and a scraper, L, and rotary brush M may be employed to clean the apron and rid it of the solid portions of the mash. To prevent the solid portions of the mash from being carried laterally over the edges of the apron, I affix to the upper sides of the edge portions of the apron ribs or ledges, of india-rubber or other suitable material which can bend in passing around the rollers, and which have abrupt inner sides. The rollers E' are shorter than the rollers E, and the apron extends laterally beyond them. Hence the ribs or ledges do not come in contact with the rollers E'. If any solid matter contained in the mash passes under the rollers E', the latter rise and accommodate it, thereby avoiding sustaining injury or entailing injury to the apron.

Although only described for treating the refuse of brewers' mash, this apparatus may be used for analogous purposes.

I am aware that it is old to employ in an apparatus for expressing liquid a reticulated or foraminous apron and pressing-rollers, between which the substance to be pressed is carried by said apron, and I do not here claim such a combination, broadly. I am also aware that an apron of the kind above described has been provided with corded or enlarged edges which fit in annular grooves in the rollers and are pressed upon by the rollers; but my machine differs from those before made in that the rollers which press upon the top of the apron are shorter than the width of the apron and work between the ribs or ledges without pressing upon them. My machine also comprises a liquid-receptacle arranged below the apron and extending beyond the edges thereof.

What I claim as my invention, and desire to secure by Letters Patent, is—

1. In an apparatus for expressing malt extract or analogous matter, the combination, with a reticulated or foraminous apron provided at the edges with upwardly-projecting ledges or ribs, of a receptacle for liquid, arranged below and extending beyond the edges of said apron, and rollers above the apron for exerting a pressure on the same, and made shorter than the width of the apron, so as to work between and not press upon the ledges or ribs, substantially as specified.

2. In an apparatus for expressing malt extract and analogous matter, the combination, with a reticulated or foraminous apron and rollers which exert a pressure on the substance carried by it, of yielding bearings hung by bolts, whereby they may be adjusted up or down, and on which they may rise and fall automatically, substantially as specified.

3. In an apparatus for expressing malt extract and analogous matter, the combination, with a reticulated or foraminous apron and rollers which exert a pressure on the substance carried by it, of yielding bearings hung by bolts, and blocks of india-rubber interposed between the bearings and housings containing them, substantially as specified.

HENRY R. RANDALL.

Witnesses:
T. J. KEANE,
JAMES R. BOWEN.